(12) United States Patent
Morikawa et al.

(10) Patent No.: US 7,450,506 B2
(45) Date of Patent: Nov. 11, 2008

(54) COMMUNICATION APPARATUS FOR TRANSMITTING FRAMES AND PRIORITY CONTROL METHOD FOR TRANSMITTING FRAMES

(75) Inventors: Kenichi Morikawa, Kawasaki (JP); Kazuhiko Morimura, Ohta-ku (JP); Jun Kawashima, Setagaya-ku (JP)

(73) Assignee: Canon Kabushiki Kaisha, Tokyo (JP)

( * ) Notice: Subject to any disclaimer, the term of this patent is extended or adjusted under 35 U.S.C. 154(b) by 554 days.

(21) Appl. No.: 11/071,483

(22) Filed: Mar. 3, 2005

(65) Prior Publication Data

US 2005/0232155 A1   Oct. 20, 2005

(30) Foreign Application Priority Data

Mar. 15, 2004   (JP)   ............................. 2004-072088

(51) Int. Cl.
  *H04L 12/26*   (2006.01)
(52) U.S. Cl. ...................................... 370/231
(58) Field of Classification Search .............. 370/230.1, 370/235, 412, 493
  See application file for complete search history.

(56) References Cited

U.S. PATENT DOCUMENTS

| 6,570,873 | B1 | 5/2003 | Isoyama et al. |
| 6,570,883 | B1 | 5/2003 | Wong |
| 2002/0097679 | A1* | 7/2002 | Berenbaum ................. 370/232 |
| 2004/0001493 | A1* | 1/2004 | Cloonan et al. ........ 370/395.42 |
| 2004/0114516 | A1* | 6/2004 | Iwata et al. .............. 370/230.1 |

* cited by examiner

*Primary Examiner*—Chirag G Shah
*Assistant Examiner*—Otis L Thompson, Jr.
(74) *Attorney, Agent, or Firm*—Canon U.S.A. Inc., I.P. Division (57) ABSTRACT

Frames of different priority levels are queued in a plurality of queues, e.g., first priority queue, second priority queue and third priority queue. If it is judged that a lower priority frame can be completely transmitted by the timing of transmitting a higher-priority frame based on the frame length, the lower-priority frame is transmitted, and otherwise, the lower-priority frame is not transmitted. Accordingly, frame transmission control that is applicable to fixed-length frames and variable-length frames is realized in a frame scheduler for an apparatus having a function of outputting frames. Also, priority-based control of frames which is suitable for a layer 2 switch or the like and which is adaptable to processing in a high-speed network is realized without providing an IP fragment.

13 Claims, 8 Drawing Sheets

COMMUNICATION APPARATUS FOR TRANSMITTING FRAMES AND PRIORITY CONTROL METHOD FOR TRANSMITTING FRAMES

BACKGROUND OF THE INVENTION

1. Field of the Invention

The present invention relates to a communication apparatus for transmitting frames and a priority control method for transmitting frames.

2. Description of the Related Art

In a best-effort network using a CSMA/CD system or a full duplex system, the needs for transmitting a real-time data stream of audio and video data have intensified.

However, it is difficult to reliably transmit a predetermined amount of real-time video/audio data stream (information) in its original form within a predetermined time period in the nature of the best-effort network. This situation poses a challenge of ensuring a quality of service (QoS) to an application which requires real-time transmission.

The challenge may be roughly classified into four items: guarantee of delay; guarantee of delay distribution (fluctuation); guarantee of bandwidth; and guarantee of packet loss factor. The following four techniques have been known as solutions to these challenges.

(1) Classification (Classifier)

In a router or switch, traffic is classified based on the source and destination, the TCP/UDP port number, and the ToS field of each arrived frame.

(2) Admission Control

A method for controlling the reservation of resources in each session. Resources on a path are secured by a setup protocol at start of a session, but the session is not started if the resources cannot be secured.

(3) Frame Scheduler

A method for controlling a schedule of transmitting frames which are classified into groups. Various methods may be used depending on a queuing method and a buffer management method.

(4) Traffic Shaping (Shaper)

A technique of maintaining entered burst traffic at a uniform rate.

Among these techniques, the technique of (3): frame scheduler is important in order to ensure CoS and QoS in a system having a function of outputting frames, such a terminal or a switch.

Normally, a frame scheduler creates an appropriate transmission schedule for realizing desired priority-based processing after frames have been input to a plurality of output queues. Various types of scheduling algorithms may be used, and the respective algorithms provide different operations so that one of them must be selected for a performance. Widespread examples include weighted fair queuing (WFQ) and strict priority processing.

The WFQ is the most general method among methods in which high priority is given to a high-priority queue but every low-priority queue is not eliminated. In this method, weight is assigned to each queue.

Figure 8:
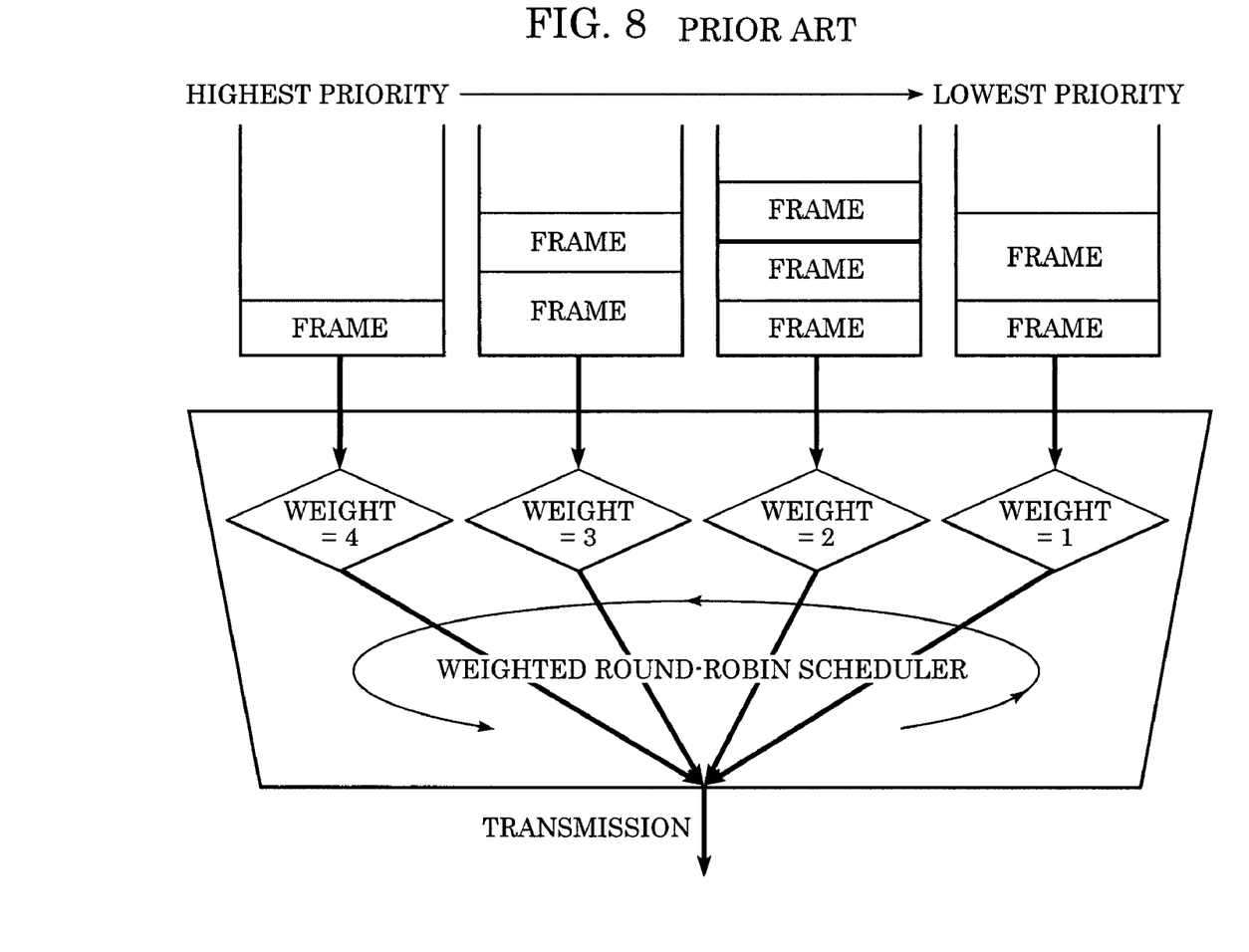
FIG. 8 shows a state where each frame is transmitted in the known art.

FIG. 8 shows a manner of transmitting each frame in the known art.

As shown in FIG. 8, the weight of a higher-priority queue is larger than that of a lower-priority queue. The output scheduler controls the schedule by using a round-robin algorithm for considering the indicated weight. A certain level of priority of frames can be maintained by assigning weight in proportion to a bandwidth or in units of frames.

On the other hand, in the strict priority processing scheme, the scheduler constantly extracts frames from the highest-priority queue among queues which are not empty. In the strict priority processing scheme, as the name thereof represents, the level of priority is interpreted in its literal sense. In this case, a higher-priority queue is processed prior to a lower-priority queue.

In particular, when an audio or motion-picture application, which must be transmitted in real time, is to be transmitted, the frame thereof must be processed as the highest-priority frame. In the strict priority processing scheme, in a case where frames exist both in high-priority and low-priority queues, if a frame arrives at the high-priority queue after transmission of a frame in the low-priority queue has started, the frame in the high-priority queue cannot be transmitted until the low-priority frame is completely transmitted, thus real-time transmission cannot be realized.

As a method for overcoming this disadvantage, a method for switching cells according to a predetermined time schedule has been known (e.g., see U.S. Pat. No. 6,570,873 (Japanese Patent Laid-Open No. 2000-151703)).

Also, as a method for overcoming the disadvantage, a method for fragmenting a low-priority packet and inserting the fragments between high-priority packets is known (e.g., see WO 2002/01821 A1 (Japanese Patent Laid-Open No. 2002-016637)).

However, the method for switching cells according to a predetermined time schedule described in U.S. Pat. No. 6,570,873 (Japanese Patent Laid-Open No. 2000-151703) is adaptable only to fixed-length cells, and is not applicable to variable-length frames in Ethernet or the like.

On the other hand, in the method for fragmenting a low-priority packet and inserting the fragments between high-priority packets described in WO 2002/01821 A1 (Japanese Patent Laid-Open No. 2002-016637), IP fragment must be installed, which is not suitable for a layer 2 switch or the like. Further, cyclic redundancy check (CRC) must be performed again after fragmentation. If fragmentation and re-calculation of CRC become complicated, a significant amount of time is required for the calculation, and thus processing delay may occur in a high-speed network.

SUMMARY OF THE INVENTION

The present invention provides a frame scheduler for an apparatus having a function of outputting frames, the frame scheduler being applicable to variable-length frames and not needing to include a fragmentation function.

According to an aspect of the present invention, a communication apparatus includes: a plurality of accumulating devices including a first priority accumulating device and at least one non-first priority accumulating device for queuing frames of different priority levels; and a transmitting device for transmitting a non-first priority frame, accumulated in one of the at least one non-first priority accumulating devices, in accordance with timing of transmitting a first priority frame accumulated in the first accumulating device.

Also, the present invention provides a method for priority control of frames, the method being adaptable to processing in a high-speed network.

According to another aspect of the present invention, a priority control method for transmitting frames of a plurality of priority levels includes: a judging step of judging whether transmission of a second priority frame can be completed by timing of transmitting a first priority frame; and a transmitting step of transmitting the second priority frame if the judging step judges that transmission of the second priority frame can be completed by the timing of transmitting the first priority frame.

Further features and advantages of the present invention will become apparent from the following description of an exemplary embodiment with reference to the attached drawings.

DESCRIPTION OF THE EMBODIMENT

Hereinafter, an embodiment of the present invention will be described.

Figure 1:
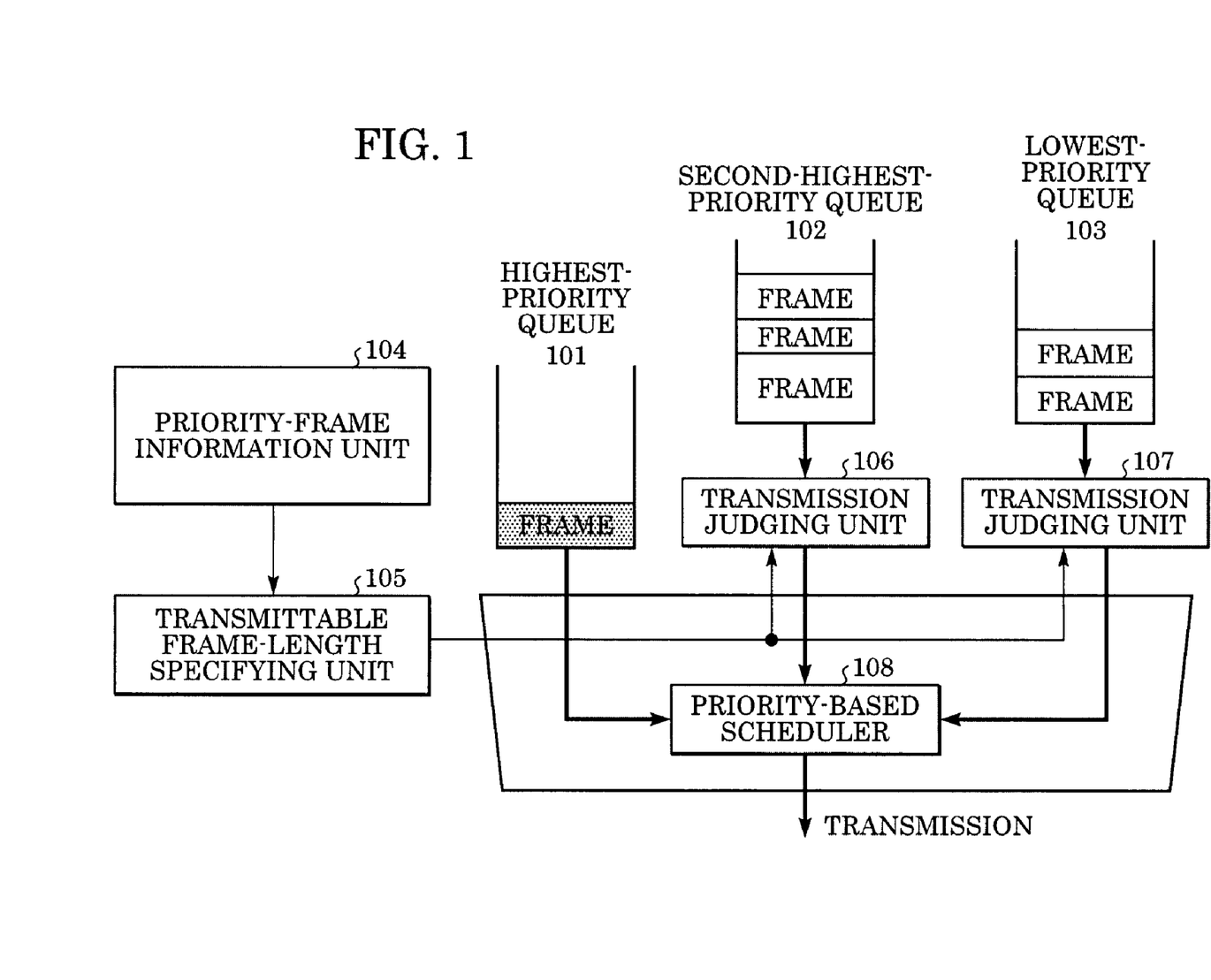
FIG. 1 is a block diagram showing a system of controlling output queues according to an embodiment of the present invention.

FIG. 1 is a block diagram showing a system of controlling output queues according to the embodiment of the present invention.

In the embodiment, the system includes three output queues 101, 102, and 103 for controlling frames having different priority levels; a priority-frame information unit 104; a transmittable frame-length specifying unit 105; transmission judging units 106 and 107; and a priority-based scheduler 108.

Highest-priority frames, such as frames of audio or moving pictures which must be transmitted in real time, are input to the highest-priority queue 101. Frames having a certain level of priority are input to the second-highest-priority queue 102, but real-time transmission need not be ensured to these frames. The other frames are input to the lowest-priority queue 103. The priority-frame information unit 104 holds information of the transmission timing of the highest-priority frame which is to arrive next, and notifies the transmittable frame-length specifying unit 105 of the timing.

The transmittable frame-length specifying unit 105 calculates the length of a frame which can be transmitted by the timing of transmitting the highest-priority frame which must be transmitted next and notifies the transmission judging units 106 and 107 of the calculated length. Each of the transmission judging units 106 and 107 compares the length of the frame to be transmitted next in the queue connected thereto with the frame length which has been notified from the transmittable frame-length specifying unit 105. If the length of the frame to be transmitted next is longer than the frame length notified from the transmittable frame-length specifying unit 105, the transmission judging units 106 and 107 refuse transmission. If the length of the frame to be transmitted next is shorter, the transmission judging units 106 and 107 permit transmission.

The priority-based scheduler 108 basically extracts frames in order of priority from queues which are not empty, but does not extract any frame if the transmission judging units 106 and 107 refuse transmission. In the embodiment, the strict priority processing scheme is adopted in the priority-based scheduler 108 for the queues 102 and 103 other than the highest-priority queue 101, but another scheme may be adopted for these queues.

Figure 2:
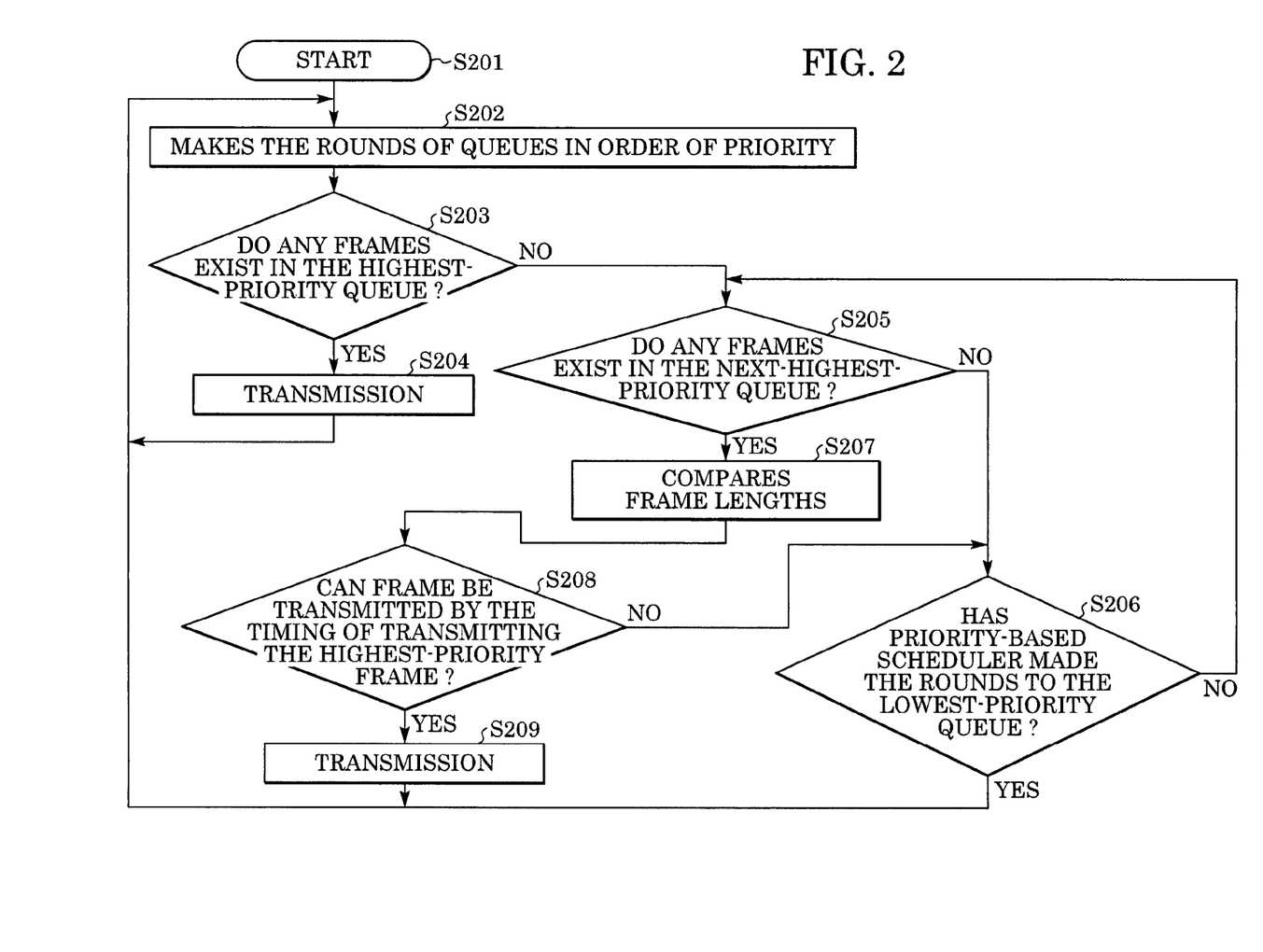
FIG. 2 is a flowchart showing an operation of controlling queues according to the embodiment.

FIG. 2 is a flowchart showing an operation of controlling queues according to the embodiment.

After the control operation has started (S201), the priority-based scheduler 108 makes the rounds of the queues in order of priority (S202) and judges whether any frames exist in the highest-priority queue 101 in step S203. If one or more frames exist in the highest-priority queue 101 (S203), the priority-based scheduler 108 extracts and transmits the frame(s) (S204).

If no frame exists in the highest-priority queue 101 (S203), the priority-based scheduler 108 judges whether any frames exist in the next-highest-priority queue (S205). If there is no frame (S205), the priority-based scheduler 108 judges whether it has made the rounds of every queue to the lowest-priority queue (S206). If the priority-based scheduler 108 has made the rounds of every queue to the lowest-priority queue (S206), the process returns to step S202, and the priority-based scheduler 108 starts to make the rounds of the queues in order of priority.

If the priority-based scheduler 108 has not yet made the rounds to the lowest-priority queue (S206), the process returns to step S205, where the priority-based scheduler 108 judges whether any frames exist in the next-highest-priority queue. If one or more frames exist in the next-highest-priority queue (S205), the transmission judging unit connected to the queue compares frame lengths (S207) and judges whether the frame in the next-highest-priority queue can be completely transmitted by the timing of transmitting the highest-priority frame (S208).

If the frame in the next-highest-priority queue can be completely transmitted by the timing of transmitting the highest-priority frame (S208), the priority-based scheduler 108 extracts and transmits the frame (S209). Otherwise (S208), the process returns to step S206, where it is judged whether the priority-based scheduler 108 has made the rounds to the lowest-priority queue.

Next, frame control in an environment where an application which is applied to an output port of a switching HUB and which requires real-time transmission and other applications are mixed will be described.

Figure 3:
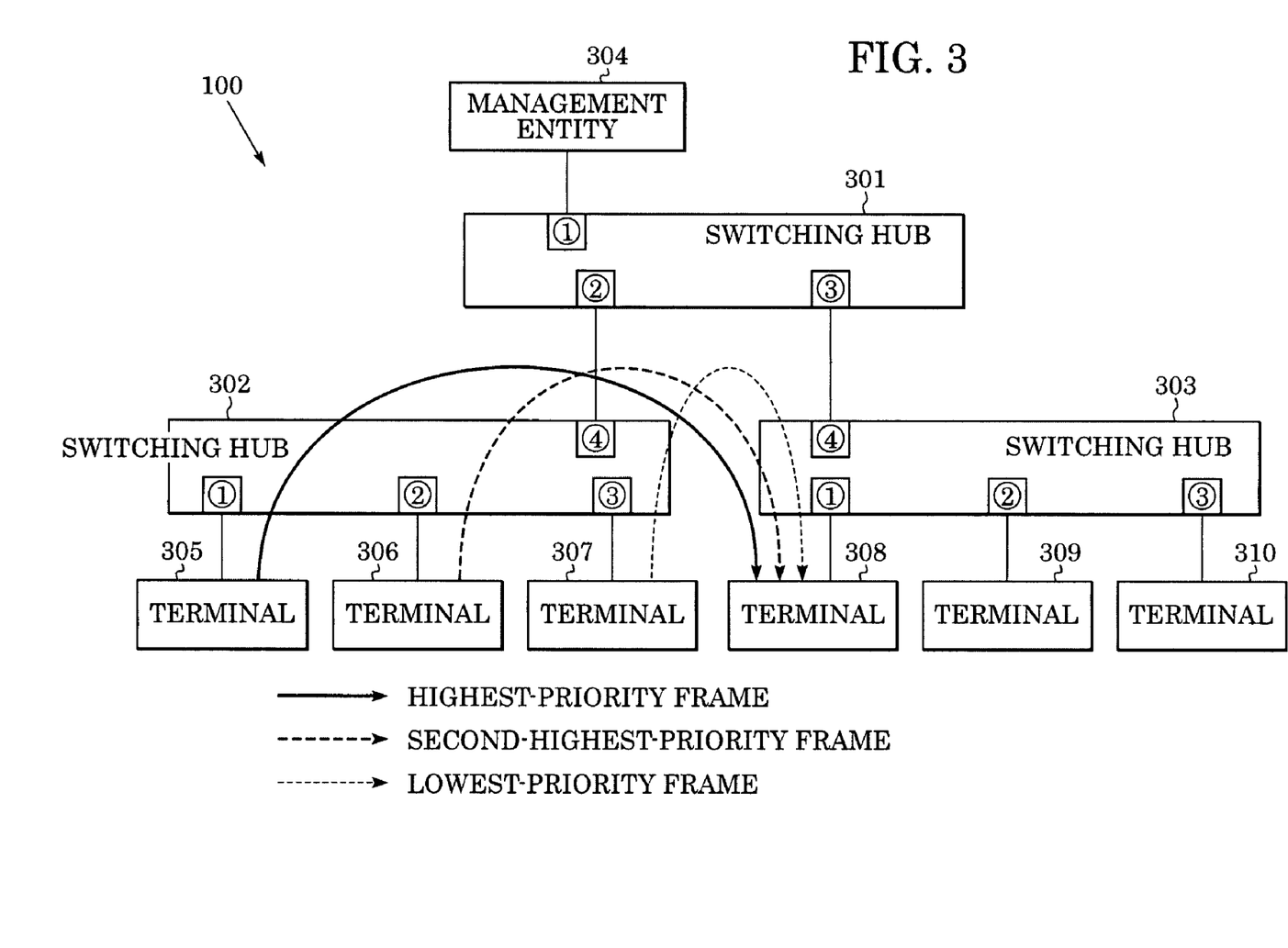
FIG. 3 shows the system configuration of a frame priority controller according to the embodiment.

FIG. 3 shows the system configuration of a frame priority controller 100.

In the frame priority controller 100, a management entity 304 is connected to a port 1 of a switching HUB 301. The management entity 304 manages the entire system and performs connection management of the highest-priority frame communication and priority setting of switching. A port 4 of a switching HUB 302 is connected to a port 2 of the switching HUB 301, and a port 4 of a switching HUB 303 is connected to a port 3 of the switching HUB 301.

A terminal 305 is connected to a port 1 of the switching HUB 302, a terminal 306 is connected to a port 2 of the switching HUB 302, and a terminal 307 is connected to a port 3 of the switching HUB 302. A terminal 308 is connected to a port 1 of the switching HUB 303, a terminal 309 is connected to a port 2 of the switching HUB 303, and a terminal 310 is connected to a port 3 of the switching HUB 303.

Figure 4:
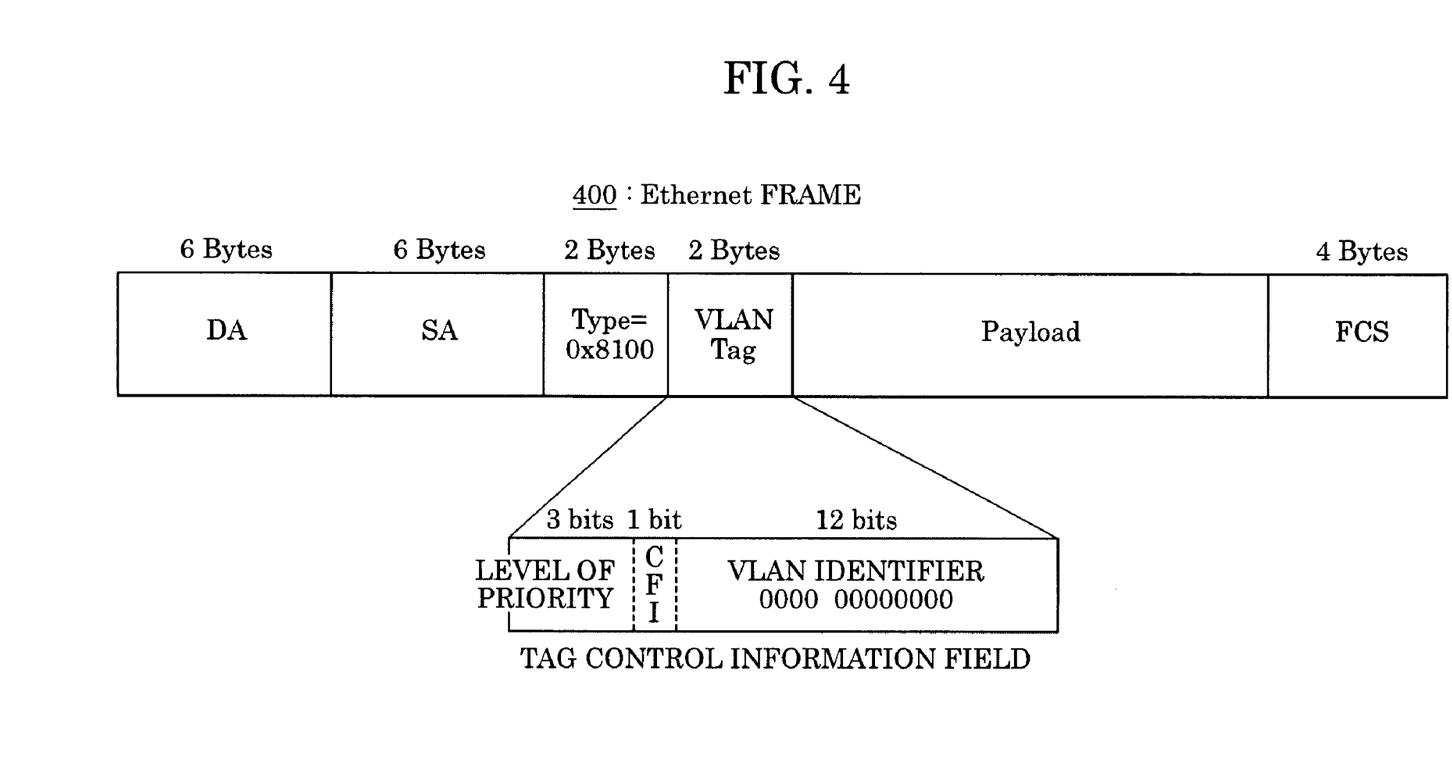
FIG. 4 shows an Ethernet frame with a priority-level tag according to the embodiment.

FIG. 4 shows an Ethernet frame 400 with a priority-level tag according to the embodiment.

Each terminal connected to the switching HUBs transmits the Ethernet frame 400 with a priority-level tag shown in FIG. 4. The format of the frame 400 includes 6 bytes of destination address DA; 6 bytes of source address SA; a two-byte type field Type having a VLAN protocol identifier (0x8100); 2 bytes of tag control information field VLANTag; a payload unit PayLoad; and a four-byte frame error sequence FCS for detecting errors.

The first 3 bits of the tag control information field indicate the level of the user priority of the frame. This field can be set to a value from 0 to 7. Definitions can be established in the system, for example, an application requiring real-time transmission is transmitted when the level of priority is set to 7 (the highest priority) in the frame. The next field CFI is a canonical format specifier, which is a term relating to a bit order of a byte of a frame (little endian or big endian).

The VLAN identifier explicitly indicates the association of the frame with a VLAN. Particularly, as shown in FIG. 4, when the value of the VLAN identifier is 0x000, the VLAN identifier is used only for indicating the level of priority, not for indicating the association with the VLAN. This embodiment uses a VLAN tag for explicitly indicating the level of priority, but other various things may be used, for example, a TOS field of an IP.

Figure 5:
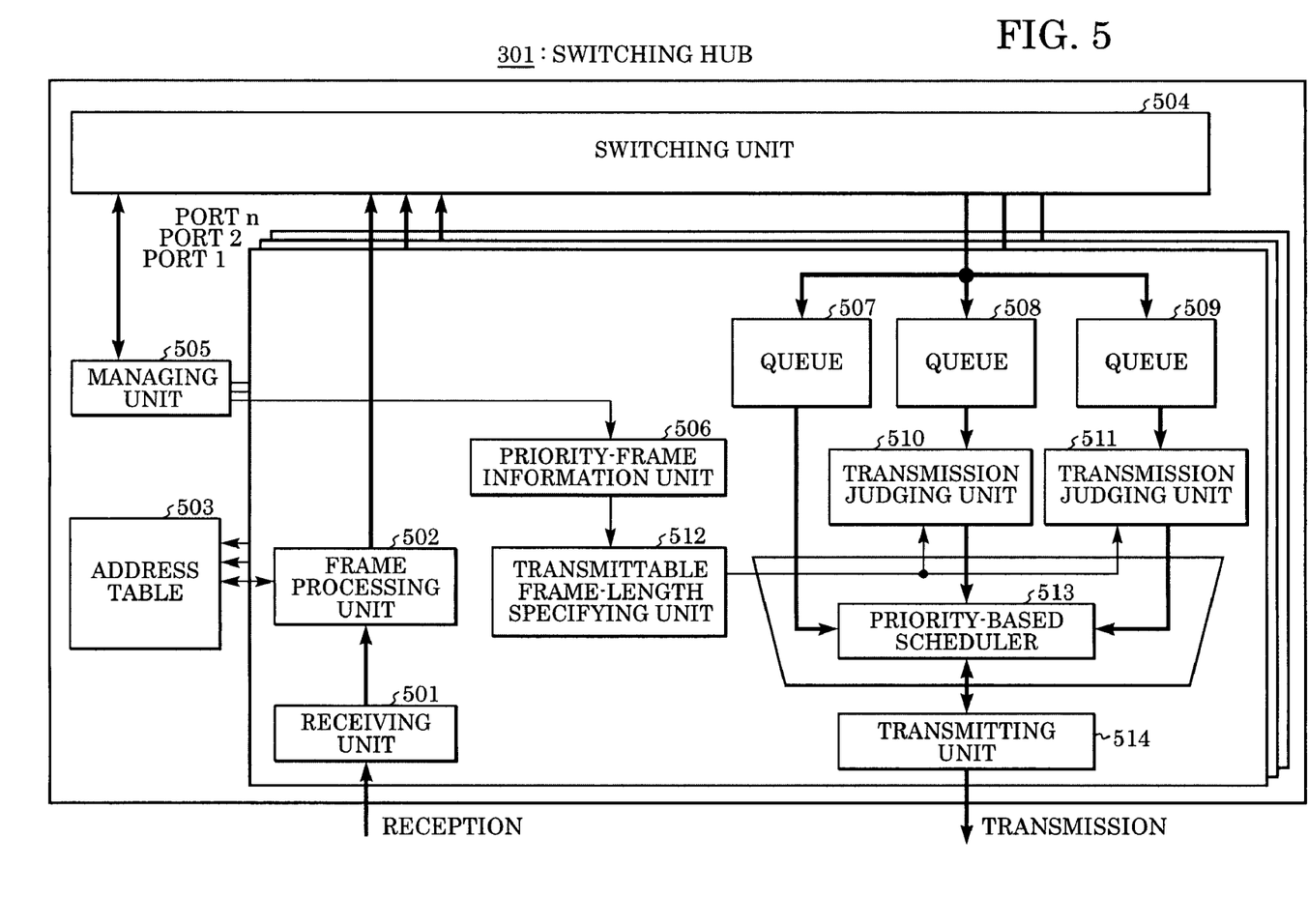
FIG. 5 is a block diagram showing the internal configuration of a switching HUB according to the embodiment.

Next, the internal configuration of the switching HUB 301 will be described.

FIG. 5 is a block diagram showing the internal configuration of the switching HUB 301.

A plurality of ports are provided in the switching HUB, but only one port is shown in FIG. 5.

The internal configuration of the switching HUBs 302 and 303 is the same as that of the switching HUB 301.

A receiving unit 501 receives a frame and transmits it to a frame processing unit 502. The frame processing unit 502 searches an address table 503 for the source address of the frame. If the source address cannot be found, the frame processing unit 502 registers (learns) the source address and the port number at which the frame was received in the address table 503.

Further, the frame processing unit 502 searches the address table 503 for the destination address of the frame. If the destination address is found, the frame processing unit 502 attaches the port number, which is registered in association with the address, to the frame as switching information and transmits the frame to a switching unit 504. If the destination address cannot be found, the frame processing unit 502 attaches switching information for a flooding instruction to the frame and transmits the frame to the switching unit 504.

The switching unit 504 transmits the frame to the appropriate queue of the appropriate destination port based on the switching information attached to the frame and the priority-level information which is explicitly indicated in the frame. In this case, three queues 507, 508, and 509 are connected in order of priority.

If the destination address of the frame is the switching HUB itself, the frame is transmitted from the switching unit 504 to a managing unit 505. The managing unit 505 manages communication such as setting to the switching HUB. In particular, the managing unit 505 notifies a priority-frame information unit 506 of the setting about a priority frame. The priority-frame information unit 506 holds information about the next transmission timing of a frame which arrives at the highest-priority queue 507 and notifies a transmittable frame-length specifying unit 512 of the information.

The transmittable frame-length specifying unit 512 calculates the length of the frame which arrives at the queue 507 and which can be completely transmitted by the next transmission timing, and notifies transmission judging units 510 and 511 of the calculated frame length. Each of the transmission judging units 510 and 511 compares the length of the frame to be transmitted next in the queue connected thereto with the frame length notified from the transmittable frame-length specifying unit 512. If the frame length notified from the transmittable frame-length specifying unit 512 is longer, the transmission judging units 510 and 511 refuse transmission. If the frame length notified from the transmittable frame-length specifying unit 512 is shorter, the transmission judging units 510 and 511 permit transmission.

A priority-based scheduler 513 basically extracts frames from the queues that are not empty in order of priority. However, if the transmission judging units 510 and 511 refuse transmission, no frame is extracted. Frames extracted from each queue by the priority-based scheduler 513 are transmitted to a transmitting unit 514 and the frames are transmitted from the port.

Next, referring to FIG. 3, assume that the second-highest-priority frame in the entire system is transmitted from the terminal 306 to the terminal 308 and that the lowest-priority frame is transmitted from the terminal 307 to the terminal 308. Hereinafter, a procedure of transmitting highest-priority frames from the terminal 305 to the terminal 308 in this state will be described.

Figure 6:
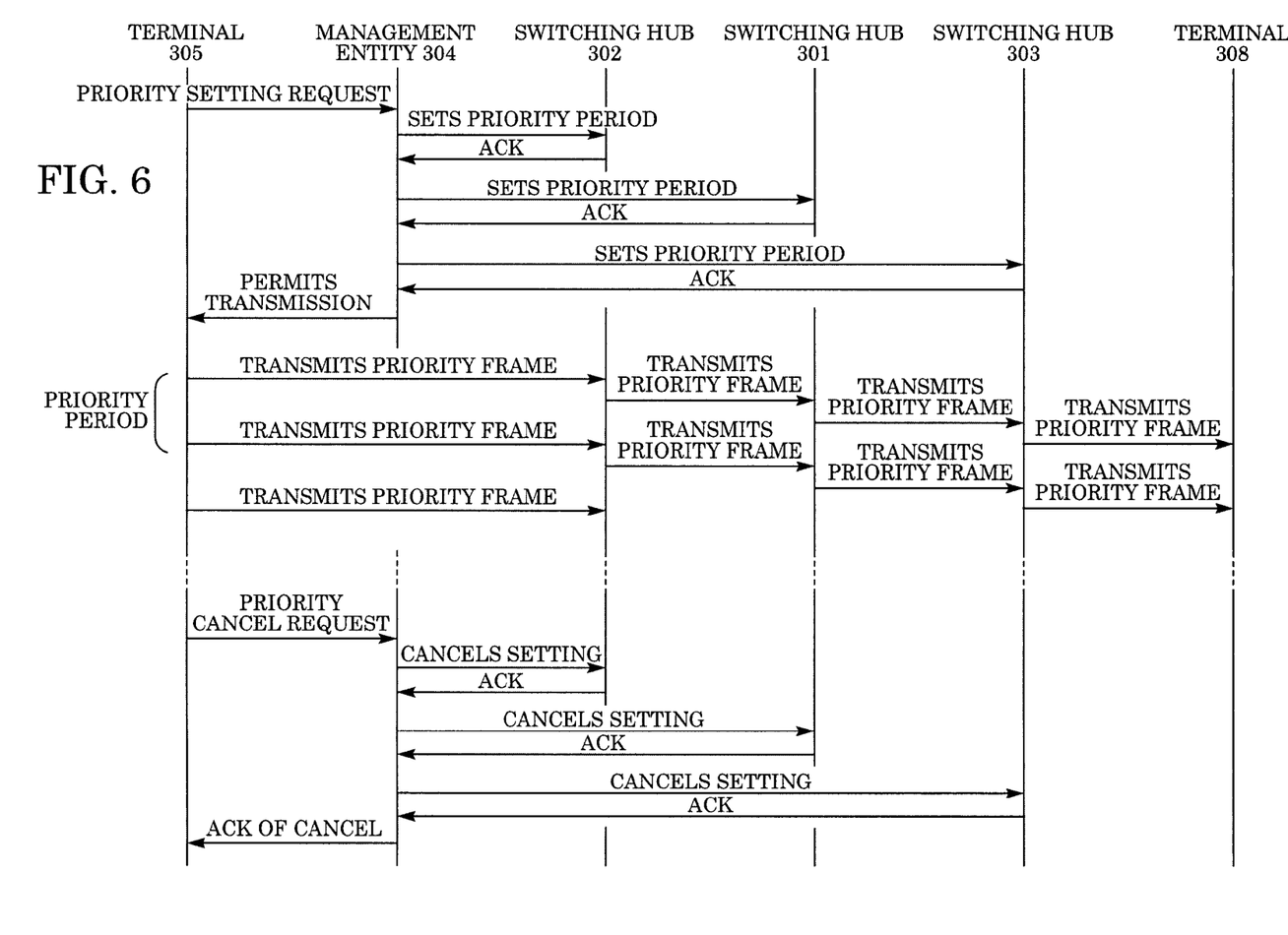
FIG. 6 shows a procedure of transmitting highest-priority frames from a terminal 305 to a terminal 308 according to the embodiment.

FIG. 6 shows the procedure of transmitting highest-priority frames from the terminal 305 to the terminal 308 in the embodiment.

The terminal 305 transmits a priority setting request including information of the priority period, information of the destination terminal, and a priority setting request frame including the frame length to the management entity 304. The management entity 304 manages connection of priority control, judges whether the request from the terminal 305 can be accepted based on the network status, and transmits a transmission refusal frame to the terminal 305 if the request is unacceptable (not shown).

If the request from the terminal 305 is acceptable, the management entity 304 sets the priority period to the port 4 of the switching HUB 302, the port 3 of the switching HUB 301, and the port 1 of the switching HUB 303 in the path from the terminal 305 to the terminal 308, as shown in FIG. 6.

Each switching HUB sets the priority period to the port to be set and then transmits an acknowledgement (ACK) to the management entity 304. The management entity 304 transmits a transmission permission frame to the terminal 305 only if ACK has been returned from all of the switching HUBs. If ACK has not been returned from all of the switching HUBs, the management entity 304 transmits a transmission refusal frame to the terminal 305.

The terminal 305 receives the transmission permission frame from the management entity 304 and transmits frames according to the priority period which was transmitted together with the priority frame request. Each switching HUB transmits the received priority frame prior to other frames. The details of the priority-based transmission will be described later with reference to FIG. 7.

After the terminal 305 has transmitted priority frames, the terminal 305 transmits a priority cancel request frame to the management entity 304 in order to cancel the priority setting which is set to each switching HUB.

The management entity 304 receives the priority cancel request frame and transmits a setting cancel frame to each switching HUB. Each switching HUB cancels the setting and transmits ACK to the management entity 304. The management entity 304 receives ACK from all of the switching HUBs and transmits a priority-cancel ACK frame, which indicates that the priority settings have been canceled, to the terminal 305, so that the procedure of transmitting the highest-priority frames is completed.

Figure 7:
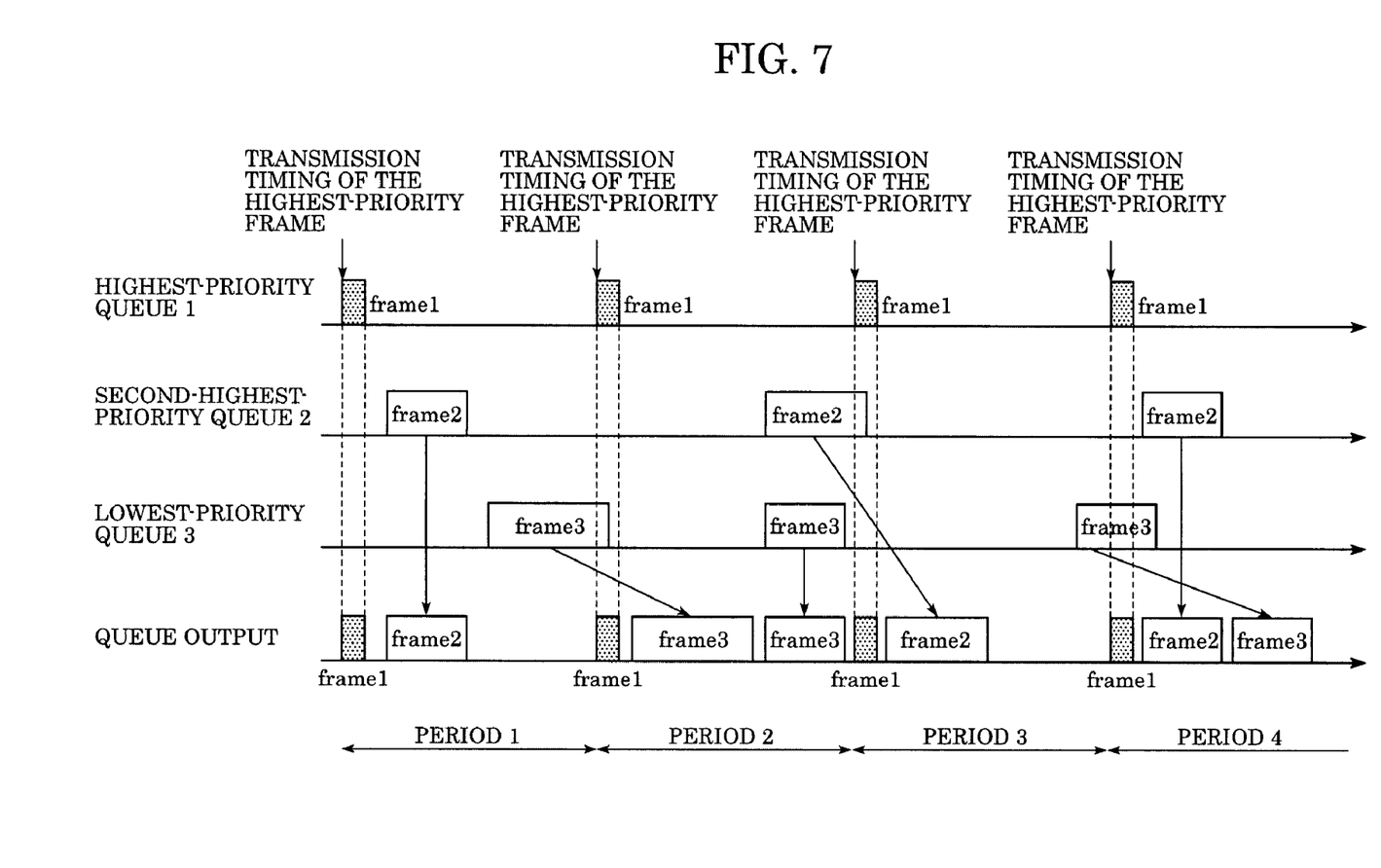
FIG. 7 shows a specific operation of priority-based transmission according to the embodiment.

Next, how the priority-based transmission is performed in the output port 4 of the switching HUB 302 will be described.

FIG. 7 shows a specific operation of priority-based transmission according to the embodiment.

As shown in FIG. 3, in the communication state, the second-highest-priority frame (frame 2) in the entire system is transmitted from the terminal 306 to the terminal 308, the lowest-priority frame (frame 3) is transmitted from the terminal 307 to the terminal 308, and the highest-priority frame (frame 1) is transmitted from the terminal 305 to the terminal 308.

Three queues 1 to 3 of different priority levels are provided at the output port 4 of the switching HUB 302. Frame 1 is input to the highest-priority queue 1, frame 2 is input to the second-highest-priority queue 2, and frame 3 is input to the lowest-priority queue 3.

The switching HUB 302 obtains the transmission timing of the highest-priority frame by the procedure of transmitting priority frames shown in FIG. 6 and transmits frames according to the flowchart of queue control shown in FIG. 2. For example, in the period 1 shown in FIG. 7, it is judged whether to transmit frame 2 from the second-highest-priority queue 2. In this case, it is judged that frame 2 can be completely transmitted by the next timing of transmitting the highest-priority frame based on the current time and the length of frame 2.

Therefore, frame 2 is transmitted from the queue output. Then, it is judged whether to transmit frame 3 from the lowest-priority queue 3. It is judged that frame 3 cannot be completely transmitted by the next timing of transmitting the highest-priority frame based on the current time and the length of frame 3. Therefore, frame 3 is not transmitted from the queue output in the period 1. Then, frame 1 is transmitted from the highest-priority queue 1 through the queue output. In the period 2, it is judged again whether to transmit frame 3, which could not be transmitted in the period 1.

In this case, it is judged that frame 3 can be completely transmitted by the next timing of transmitting the highest-priority frame based on the current time and the length of frame 3, so that frame 3 is transmitted from the queue output.

Further, in the period 2 in FIG. 7, frame 2 and frame 3 arrive at the same time at the second-highest-priority queue 2 and the lowest-priority queue 3, respectively.

First, it is judged whether to transmit frame 2 according to the order of priority. Herein, it is judged that frame 2 cannot be completely transmitted by the next timing of transmitting the highest-priority frame based on the current time and the length of frame 2. Therefore, frame 2 is not transmitted from the queue output and it is judged whether to transmit frame 3. Since frame 3 has a short length and can be completely transmitted by the next timing of transmitting the highest-priority frame, frame 3 is transmitted from the queue output.

Then, frame 1 is transmitted from the highest-priority queue 1 through the queue output. In the period 3, it is judged again whether to transmit frame 2, which could not be transmitted in the period 2. In this case, it is judged that frame 2 can be completely transmitted by the next timing of transmitting the highest-priority frame based on the current time and the length of frame 2, so that frame 2 is transmitted from the queue output. Then, in the period 3, it is judged whether to transmit frame 3 from the lowest-priority queue 3.

It is judged that frame 3 cannot be completely transmitted by the next timing of transmitting the highest-priority frame based on the current time and the length of frame 3. Therefore, frame 3 is not transmitted from the queue output in the period 3. Then, frame 1 is transmitted from the highest-priority queue 1 through the queue output.

In the period 4, frame 2 arrives at the second-highest-priority queue 2, in addition to frame 3, which could not be transmitted in the period 3.

Therefore, it is judged whether to transmit frame 2 according to the order of priority. In this case, it is judged that frame 2 can be completely transmitted by the next timing of transmitting the highest-priority frame based on the current time and the length of frame 2, so that frame 2 is transmitted from the queue output. Further, it is judged whether to transmit frame 3, which could not be transmitted in the period 3. Since frame 3 can be transmitted, frame 3 is transmitted from the queue output.

In the above embodiment, the queue output operation at the port 4 of the switching HUB 302 has been specifically described, but the queue output operation at the port 3 of the switching HUB 301 and at the port 1 of the switching HUB 303 is the same as that at the port 4 of the switching HUB 302.

According to the present invention, the frame scheduler can be applied to variable-length frames as well as to fixed-length frames, and is adaptable to processing in a high-speed network. Also, IP fragment need not be provided and a frame scheduler suitable for a layer 2 switch or the like can be provided. Since fragmentation need not be performed, re-calculation of CRC after fragmentation is unnecessary, which is appropriate for processing in a high-speed network.

While the present invention has been described with reference to an exemplary embodiment, it is to be understood that the invention is not limited to the disclosed embodiment. On the contrary, the invention is intended to cover various modifications and equivalent arrangements included within the spirit and scope of the appended claims. The scope of the following claims is to be accorded the broadest interpretation so as to encompass all such modifications and equivalent structures and functions.

This application claims priority from Japanese Patent Application No. 2004-072088 filed Mar. 15, 2004, which is hereby incorporated by reference herein.

What is claimed is:

1. A communication system for transmitting frames of a plurality of priority levels, the system having a plurality of communication nodes that connect communication terminals, the system comprising:

a management entity to set a transmission period of a first priority frame to be sent by a first communication terminal, to a plurality of communication nodes from the first communication terminal which is a source of the first priority frame to a second communication terminal which is a destination of the first priority frame, based on a transmission period notified from the first communication terminal, and to cancel the transmission period set on the plurality of communication nodes in response to a termination of the communication by the first priority frame, wherein each of the plurality of communication nodes comprises:

a judging device to judge whether transmission of a second priority frame having a lower priority than the first priority frame can be completed before the transmitting timing of the first priority frame, based on the transmission period set by the management entity and a length of the second priority frame; and a transmitting device to control a transmission of the second priority frame in accordance with a judgment result by the judging device, and wherein each of the plurality of communication nodes through which the first priority frame is transmitted executes the judgment by the judging device and the transmission control by the transmitting device.

2. A communication system according to claim 1, further comprising:

a first recognizing device to recognize a next transmitting timing of the first priority frame based on the transmission period set by the management entity;

a calculating device to calculate the length of a second priority frame that can be completely transmitted before the next transmission timing of the first priority frame;

a second recognizing device to recognize the length of the second priority frame; and a scheduling device to schedule transmission of frames accumulated in a plurality of accumulating devices in accordance with the next transmitting timing of the first priority frame by the first recognizing device, the length of the second priority frame recognized by the second recognizing device, and the length of the second priority frame calculated by the calculating device.

3. A communication system according to claim 1, wherein the transmitting device transmits the second priority frame if the second priority frame has a length such that the second priority frame can be transmitted before the transmitting timing of the first priority frame.

4. A communication system according to claim 1, wherein the transmitting device does not transmit the second priority frame if the second priority frame has a length such that second priority frame cannot be transmitted before the transmitting timing of the first priority frame.

5. A priority control method for transmitting frames of a plurality of priority levels in a communication system having a plurality of communication nodes that connect communication terminals and a management entity, the priority control method comprising:

a setting step in which the management entity sets a transmission period of a first priority frame to be sent by a first communication terminal, to a plurality of communication nodes from the first communication terminal which is a source of the first priority frame to a second communication terminal which is a destination of the first priority frame, based on a transmission period notified from the first communication terminal, and to cancel the transmission period set on the plurality of communication nodes in response to a termination of the communication by the first priority frame, each of the plurality of communication nodes performing steps including:

a judging step of judging whether transmission of a second priority frame having a lower priority can be completed before the transmitting timing of the first priority frame, based on the period set by the management entity and a length of the second priority frame; and a transmitting step of transmitting the second priority frame in accordance with a result of the judgment.

6. A priority control method according to claim 5, wherein, in the judging step, if it is judged that transmission of the second priority frame cannot be completed before the transmitting timing of the first priority frame, it is judged whether transmission of a third priority frame can be completed before the timing of transmitting the first priority frame.

7. A priority control method according to claim 5, wherein, in the judging step, the judging is based on the timing of transmitting the first priority frame and a length of the second priority frame.

8. A priority control method according to claim 5, further comprising:

an accumulating step of separately queuing the first priority frame and the second priority frame.

9. A priority control method according to claim 6, further comprising:

a first recognizing step of recognizing a next transmitting timing of the first priority frame based on the transmission period set by the management entity;

a calculating step of calculating a length of a second priority frame that can be completely transmitted before the next transmission timing of the first priority frame;

a second recognizing step of recognizing the length of the second priority frame; and a scheduling step of scheduling transmission of frames accumulated in a plurality of accumulating devices in accordance with the next transmitting timing of the first priority frame recognized at the first recognizing step, the length of the second priority frame recognized at the second recognizing step, and the length of the second priority frame calculated by the calculating step.

10. A priority control method according to claim 6, wherein the second priority frame is transmitted at the transmitting step if the second priority frame has a length such that the second priority frame can be transmitted before the transmitting timing of the first priority frame.

11. A priority control method according to claim 6, wherein the second priority frame is not transmitted at the transmitting step if the second priority frame has a length such that the second priority frame cannot be transmitted before the transmitting timing of the first priority frame.

12. A priority control method according to claim 6, wherein the management entity permits the first communication terminal to transmit the first priority frame if the management entity could set the transmission period to all communication nodes on the path for the first priority frame, and refuses the first communication terminal to transmit the first priority frame, if the management entity could not set the transmission period to the all communication nodes.

13. A communication system according to claim 1, wherein the management entity permits the first communication terminal to transmit the first priority frame, if the management entity could set the transmission period to all communication nodes on the path for the first priority frame, and refuses the first communication terminal to transmit the first priority frame, if the management entity could not set the transmission period to all communication nodes.

* * * * *